UNITED STATES PATENT OFFICE.

HARRY WILLIAMS CHARLTON, OF JONES POINT, NEW YORK, ASSIGNOR TO AMERICAN POTASH CORPORATION, A VIRGINIA COMPANY.

CEMENTING MATERIAL OBTAINED FROM GREENSAND.

1,327,145.   Specification of Letters Patent.   Patented Jan. 6, 1920.

No Drawing.   Application filed May 22, 1917. Serial No. 170,332.

*To all whom it may concern:*

Be it known that I, HARRY WILLIAMS CHARLTON, a citizen of Canada, residing at Jones Point, in the county of Rockland and State of New York, have invented certain new and useful Improvements in Cementing Materials Obtained from Greensand; and I do hereby declare the following to be a full, clear, and exact description of the invention, such as will enable other skilled in the art to which it appertains to make and use the same.

This invention relates to a cementing material obtained as a by-product in the process of producing potassium hydrate from glauconite or from the well known green sand containing the same, and has for its object to provide a material having better qualities than those heretofore proposed.

With these and other objects in view the invention consists in the novel cementing material resulting from said process, all as will be more fully hereinafter disclosed and particularly pointed out in the claim.

In carrying out this invention I may mix for example, 1000 pounds of finely divided green sand, 1000 pounds of lime and say 5000 pounds of water. This mixture is then preferably digested in an autoclave but may be heated in a vessel open to the atmosphere.

If an autoclave is employed, I prefer to raise the pressure to about 200 pounds to the square inch, or higher, and to heat the mixture for say two hours, or until the potassium iron silicate of which the glauconite consists is substantially decomposed. The resulting liquor is next separated from the insoluble residue as by filtration, whereupon the filtrate may be evaporated to recover the desired potassium hydrate, or the combined potassium present may be recovered in any other suitable manner.

The solids remaining on the filter when the pressure is as high as that above indicated are found to constitute a valuable by-product which may be used as a cementing material in the manufacture of composite brick, or for many other purposes in the plastic arts.

On the other hand, if the pressure employed is only that of the atmosphere, there will be a much smaller yield of potassium hydrate and the solids remaining on the filter would not serve their purpose as a binder. But as the pressure is increased above that of the atmosphere, the yield of potassium hydrate increases and more and more of the lime present combines with the silica as well as with the clay like substance contained in green sand, and the solids left on the filter become more and more useful under subsequent treatment as binding materials.

Finally when the pressure has reached as much as 200 pounds per square inch or has exceeded said point, then the said solids or insoluble residue on the filter are found to take on a homogeneous character, they are often of a greenish white appearance, and they constitute an exceedingly valuable substance for use as an ingredient in the making of composite brick and other plastic articles.

Said solid material is found to have the property, without further treatment, of hardening sufficiently to form a hard finish for walls and to be useful when applied to other purposes. But perhaps its most useful properties are developed after it has been further treated with steam. That is to say, when said solids are, for example, mixed with sand and the mixture subjected to the action of steam, they are changed into a self-hardening binding material of great value not only for making bricks but for a large number of other purposes.

In carrying out the above process with glauconite, I have discovered that when the pressure exceeds say 200 pounds any excess of lime that may be present undergoes a decided change in its physical condition. That is to say, said lime before this change takes place is of the composition $CaO.H_2O$, and after said change it has a composition approximating $(CaO)_2.H_2O$, and its physical character is that of a compressible, exceedingly plastic mass, with a specific gravity less than either of the compounds $CaO.H_2O$ or $CaO$ while its cementing qualities are much better than those of the normal hydrate. This said modified lime readily mixes with the above mentioned solids found on the filter, and in fact is usually recovered incorporated therewith. It further, when later subjected to the action of steam along with said solids, forms an important constituent of the resulting binding material.

What I claim is:—

The herein described cementing material of a greenish or brownish white color resulting from the digestion of green sand mixed with lime, said material when freshly made consisting of a plastic self hardening mass, and said material containing the silicates of calcium, iron and aluminum, and said material capable when treated with steam of undergoing a still further hardening process, substantially as described.

In testimony whereof I affix my signature.

HARRY WILLIAMS CHARLTON.